United States Patent [19]
Wiley

[11] 3,801,289
[45] Apr. 2, 1974

[54] CATALYTIC CONVERTER
[75] Inventor: Robert F. Wiley, Corning, N.Y.
[73] Assignee: Corning Glass Works, Corning, N.Y.
[22] Filed: May 19, 1972
[21] Appl. No.: 255,020

[52] U.S. Cl............ 23/288 F, 23/288 R, 252/477 R
[51] Int. Cl............................. F01n 3/14, B01j 9/04
[58] Field of Search............ 23/288 F; 60/299, 301; 423/213, 214; 254/477 R

[56] References Cited
UNITED STATES PATENTS

| | | | |
|---|---|---|---|
| 3,065,595 | 11/1962 | Gary | 23/288 F UX |
| 3,404,965 | 10/1968 | Shiller | 23/288 F |
| 3,441,381 | 4/1969 | Keith et al. | 23/288 F |
| 3,441,382 | 4/1969 | Keith et al. | 23/288 F |
| 3,597,165 | 8/1971 | Keith et al. | 23/288 F |
| 3,692,497 | 9/1972 | Keith et al. | 23/288 F |

FOREIGN PATENTS OR APPLICATIONS

| | | | |
|---|---|---|---|
| 605,273 | 9/1960 | Canada | 252/477 R |

Primary Examiner—Barry S. Richman
Attorney, Agent, or Firm—Charles W. Gregg

[57] ABSTRACT

A catalytic converter to be used in exhaust systems of internal combustion engines for emission control purposes. The converter comprises an assembly including pairs of circular and generally frusto-conical or funnel shaped and concentric metal housings or casings forming a container surrounding a circularly cylindrical honeycomb core catalytic member of a material having high temperature durability and a low coefficient of thermal expansion, such as a refractory ceramic material and the container is designed to compensate for the differences in thermal expansion of the material of the converter and the metal material of the assembly of the housings or casings of the container. Thermal insulation material may be provided between the walls of the concentric housings or casings.

6 Claims, 4 Drawing Figures

PATENTED APR 2 1974  3,801,289

3,801,289

CATALYTIC CONVERTER

BACKGROUND OF THE INVENTION

It has long been known that the exhaust gases from internal combustion engines of automobiles and similar types of vehicles are pollution sources which are largely responsible for air pollution problems in cities and other densely populated areas and, therefore, so-called emission control of such exhaust gases is being intensively and extensively pursued in order to reduce, to the extent possible, air pollution from said sources. Catalytic oxidation converters in the exhaust systems of automotive vehicles having internal combustion engines are extremely helpful in reducing air pollution from such sources but, insofar as is known, a completely acceptable and economical catalytic converter has not heretofore been developed.

While refractory ceramic core members for catalytic converters have been developed to the point where they perform substantially satisfactorily, such core members embody a honeycomb of very small passages or channels with relatively thin walls and the ceramic material of the core members is a relatively brittle material. For this reason the core members must be mounted in their casings or containers so that they are always securely held and do not become loose at any time so as to shake about in the casings or containers and thereby become broken up, cracked, chipped or otherwise fractured. Differences in the coefficients of thermal expansion of the ceramic materials of the core members and the metal materials of the containers or casings for such members impose the problem of mounting the core members within the containers or casings in a manner to compensate for said differences in expansion and thereby prevent said fracturing, chipping or breaking up of the core members by then shaking about in their casings or containers. Containers or casings that have been heretofore developed for the purposes of solving said problem have heretofore been either relatively elaborate or complex and, therefore, uneconomical, or have not been sufficiently durable for the satisfactory solution of the fracturing problem. The present invention was, therefore, developed to provide catalytic converters of the type mentioned including relatively economical and generally otherwise satisfactory and relatively durable casings or containers for the core members of the catalytic oxidation converters.

BRIEF DESCRIPTION OF THE DRAWINGS

In the drawings.

Similar reference characters refer to similar parts in each of the FIGS. of the drawings.

PREFERRED EMBODIMENTS OF THE INVENTION

Figure 1:
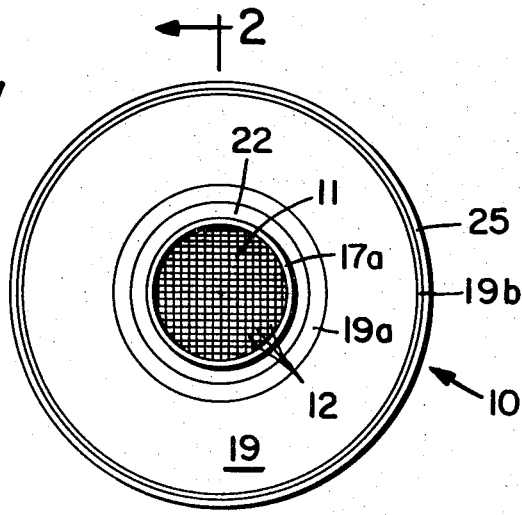
FIG. 1 is an elevational end view of one form of catalytic converter embodying the invention.
Figure 2:
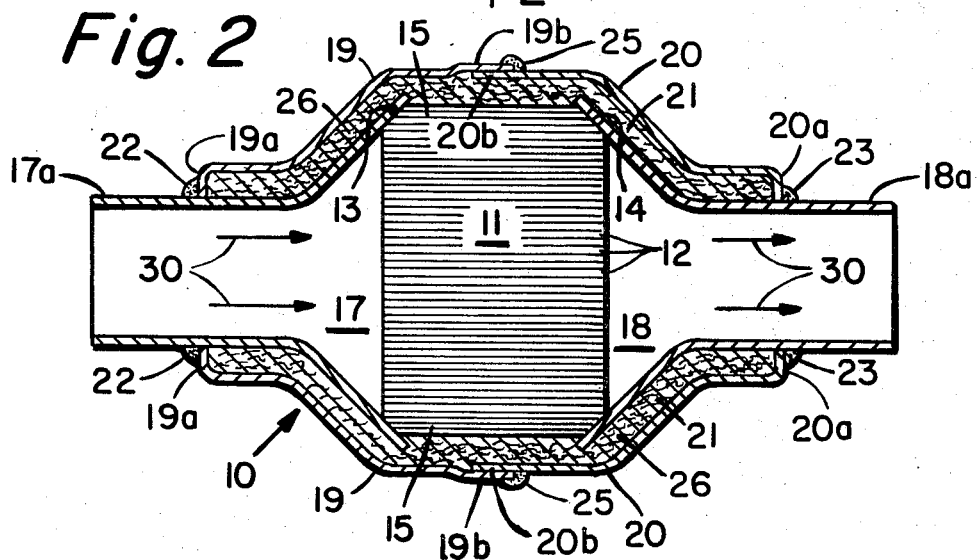
FIG. 2 is a cross-sectional view of the converter of FIG. 1, such view being taken generally along line 2—2 of FIG. 1.
Figures 3, 4:
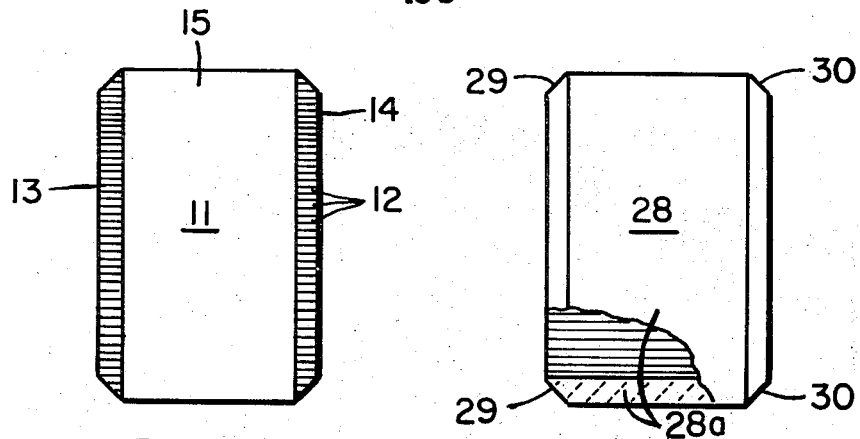
FIG. 3 is a side elevational view of one form of a core member for the catalytic converter of FIGS. 1 and 2.
FIG. 4 is a view similar to FIG. 3 but illustrating another form of a core member which may be used in the catalytic converter of the invention, part of such core member being broken away to better illustrate the structure of the core member.

Referring to the drawings in detail, there is shown in FIGS. 1 and 2 a catalytic converter 10 comprising a circularly cylindrical honeycomb body or core member 11 (see also FIG. 3) of a refractory ceramic material having a myriad of relatively minute passages such as 12 extending therethrough from one circular end of the core member or honeycomb body to the other. The brims 13 and 14 of the honeycomb body or core member 11 are evenly beveled or chamfered as illustrated in FIGS. 2 and 3 and the outer periphery of member 11 between said beveled brims 13 and 14 is preferably provided with a substantially hermetic band 15 which may, for example, be of the same refractory ceramic material as the core member 11 itself.

Core member or honeycomb body 11 may, for example, be made by the method disclosed in U.S. Pat. No. 3,246,972, issued Apr. 19, 1966 to Gail P. Smith, and reference is made to lines 52 through 75 of column 4 and lines 1 through 73 of column 5 of such patent if a specific example of one method of making the honeycomb body 11 is desired. Reference is also made to copending application Ser. No. 260,127, filed June 6, 1972 by Raymond J. Mras and entitled Winding Apparatus, such application being assigned to the same assignee as the present application. Said copending application of R. J. Mras covers an apparatus for spiraling winding strips of material into circularly cylindrical bodies without the use of a center or central core member and, therefore, providing such bodies having no center or central openings extending therethrough where core members were removed following the winding of the cylindrical bodies. Such winding apparatus can be expeditiously used in conjunction with the method covered by the cited patent to G. P. Smith to form refractory ceramic core members or honeycomb bodies such as 11 of the present application. Following the making of the honeycomb body or core member 11 per se, the walls of the passages such as 12 extending through the body or core member has an oxidation catalyst deposited thereon, such catalysts and methods of deposition thereof being well known in the art. In this connection reference is made to U.S. Pat. No. 3,441,381, issued Apr. 29, 1969 to C. D. Keith et al.

Referring further to FIG. 2, there is provided first and second generally funnel shaped and identical metallic inner casings 17 and 18, respectively, each having a large open end of a diameter slightly greater than the diameter of core member 11 and each tapering from said large open ends at angles conforming or corresponding to the angles of the beveled brims or chamfers 13 and 14 of body or core member 11. Casings 17 and 18 are preferably made of a stainless steel material in order to provide relatively smooth surfaces for the casings, and because of the relatively high oxidation resistance properties and relatively low coefficient of thermal expansion of such a metallic material. The large open ends of casings 17 and 18 taper to small circularly cylindrical ends 17a and 18a, respectively, which form inlet and outlet conduits for exhaust gases as further discussed hereinafter.

Casings 17 and 18 are disposed oppositely each other and core member or body 11 is positioned between said casings with the brims or chamfers 13 and 14 of the core member in firm contact with the inner surfaces of casings 17 and 18, respectively, adjacent said large open ends thereof. First and second generally funnel shaped metallic outer casings 19 and 20 surround and enclose inner casings 17 and 18 and core member or body 11 with a space 21 provided between said outer casings and said inner casings and said core member. Casings 19 and 20 are preferably made of a stainless steel material which has, for example, a coefficient of thermal expansion of about half that of the stainless steel material of casings 17 and 18. The small ends 19a and 20a of casings 19 and 20 bend abruptly inwardly to peripherally contact the outer peripheries of ends 17a and 18a of inner casings 17 and 18, respectively, and are welded to such outer peripheries as indicated by annular welds 22 and 23, respectively.

The large end 19b of casing 19 is enlarged or has an increased diameter which begins at the opening into such large end and extends for some distance into such end. Such enlarged end of casing 19 has an inner diameter which corresponds to the outer diameter of the large end 20b of casing 20 and such end 20b fits snugly within end 19b of casing 19 in a telescope fashion as is readily apparent from a brief glance at FIG. 2. Casings 19 and 20 are fitted to each other as mentioned and are then pressed towards each other so that said beveled brims or chamfers 13 and 14 of core member or body 11 are in firm contact with the inner surfaces of the large ends of casings 17 and 18 as previously mentioned. Outer casings 19 and 20 are then connected with each other as by welding for example and as indicated by the annular weld 25 surrounding said casings. However, prior to such welding, casings 19 and 20 are pulled toward each other to put such casings under a substantial amount of tension and inner casings 17 and 18, and core member 11 under a substantial amount of compressive force.

Although it is not necessary to the invention, it may be desirable or expedient to provide a resilient thermal or high temperature insulation material such as 26 in the space 21 provided between outer casings 19 and 20, and inner casings 17 and 18 and core member or body 11, in order to reduce the temperature which such outer casings may otherwise attain during use of the catalytic converter of the invention. Thermal insulation materials such as 26 and having suitable resiliences are well known.

FIG. 4 illustrates a honeycomb body or core member 28 which is similar to body or core member 11 of FIG. 3 and may be used in place of core member 11 in the catalytic converter. Honeycomb body or core member 28 is provided about its entire outer circumferential periphery, including the beveled brims or chamfers 29 and 30 of such body or core member, with a band 28a which is similar to the band 15 of core member 11 but substantially thicker and which may be made out of the same refractory ceramic material as that of body or core member 28. It is believed that the structure of core member 28 will be readily apparent from a brief glance at FIG. 4 taken in conjunction with the foregoing brief discussion but attention is especially directed to the broken-away portion of core member 28 for a clear understanding of the structure of such core member.

In use the catalytic converter of the invention is connected to the exhaust system of an internal combustion engine so that the exhaust gases or emissions from such engine flow, for example, into gas inlet conduit 17a (small end of casing 17) through the core member or honeycomb body of the converter in the right hand direction, as indicated by arrows such as 30 in FIG. 2, and thence out of the converter through gas outlet conduit 18a (small end of casing 18). However, as is believed obvious, the catalytic converter could be connected to an exhaust system so that the exhaust gases flow through the converter in the direction opposite to that mentioned above, and conduits 18a and 17a then become the inlet and outlet conduits, respectively.

When the catalytic converter is connected to an exhaust system of an engine as mentioned and such engine is operating, the exhaust gases flow through core member or honeycomb body 11 and the temperature of such member is raised to about 1500°F under steady operating conditions and may at times reach a temperature of about 1600°F. At such times inner casings 17 and 18 attain a temperature of about 1100°F. while outer casings 19 and 20 reach a temperature of about 580° to 600°F. The temperature coefficient of thermal expansion of the material of core member or honeycomb body 11 is, for example, on the order of $12.5 \times 10^{-7}$ per degree F and, under such conditions, the materials of the inner and outer casings are selected to have temperature coefficients of thermal expansion on the order of $11 \times 10^{-6}$ per degree F and $6 \times 10^{-6}$ per degree F, respectively.

As core member 11 increases in temperature from the heat of the exhaust gases, it expands radially and linearly and is, thereby, subject to increasing compressive forces. However, as casings 17 and 18 also increase in temperature they also expand radially and linearly. Such linear expansion tends to apply even greater compressive forces to member 11 but the radial expansion of casings 17 and 18 tends to somewhat relieve such compressive forces because the beveled brims or chamfers 13 and 14 of member 11 are free to move or slide on the contacted internal surfaces of the casings 17 and 18 adjacent the large ends of such casings. As outer casings 19 and 20 increase in temperature and expand linearly, said additional compressive forces are further relieved as the linear expansion of the inner casings is compensated for to some extent by said linear expansion of the outer casings. Radial expansion of the outer casings can, of course, be ignored. In any event the radial expansion of the inner casings and the linear expansion of the outer casings is sufficient to prevent the subjection of core member or honeycomb body 11 to undue compressive stresses while at the same time maintaining the chamfers or beveled brims of such members or body in firm contact with said inner surfaces of the inner casings and, thereby, prevent shaking about of the core member or body 11 and consequential chipping, breaking up or other fracturing of such body or member.

When the engine whose exhaust system includes the converter of the present invention is subsequently slowed down or turned off and the flow of said exhaust gases is thereby reduced or terminated, core member or body 11 cools more rapidly than the inner and outer casings. This, of course, causes contraction of the core member or body 11 but, due to said compressive forces, not to such an extent that the beveled brims or chamfers of such core member are not maintained in firm contact with casings 17 and 18. Such contact is also maintained as the casings subsequently contract due to their temperatures lowering during cooling thereof. As all of the components including core member or honeycomb body 11, inner casings 17 and 18, and outer casings 19 and 20 return to their initial or ambient temperatures, the beveled brims or chamfers 13 and 14 of core member or body 11 return to their original firm contact with the inner surfaces of casings 17 and 18 with the initial or original amount of compressive force existing between core member 11 and such casings.

The previously mentioned thermal insulating material 26, which may be provided in the space 21 surrounding inner casings 17 and 18 and core member 11, prevent casings 19 and 20 from reaching a temperature such that fire hazards might be encountered under exceptional circumstances such as, for example, when an automobile embodying the converter of the present invention is driven through or is parked in an area of relatively high and dry grass which comes in contact with said outer casings following an immediately previous period of relatively high speed or steady operation of such vehicle.

Although there is herein shown and described in detail only one form of a catalytic converter embodying the invention, and minor modifications which may be made therein, it will be understood that additional various changes may be made in the converter within the purview of the appended claims without departing from the spirit and scope thereof.

I claim:

1. A catalytic converter comprising, in combination;

A. a circularly cylindrical core member of a refractory ceramic material having a myriad of passages extending therethrough from one circular end thereof to the second circular end thereof, the brims of said circular ends being evenly beveled or chamfered and the walls of said passages having an oxidation catalyst deposited thereon;
   B. first and second oppositely disposed and generally funnel shaped metallic inner casings whose large open ends have a diameter slightly greater than the diameter of said core member and which taper at angles conforming to said beveled brims of the circular ends of the core member, said large open ends of said first and second casings surrounding and in firm contact with the beveled brims of the first and second circular ends respectively of the core member; and
   C. first and second oppositely disposed and generally funnel shaped metallic outer casings surrounding and completely enclosing said inner casings and said core member with an annular space provided between the outer casings and the inner casings and the core member, and with means joining the smaller ends of the outer casings to the smaller ends of the inner casings and with means joining the larger ends of the outer casings to each other with the outer casings under tension and the inner casings and core member under compression, such smaller ends of the inner casings forming inlet and outlet conduits for the exhaust gases from an internal combustion engine.

2. A catalytic converter in accordance with claim 1 and in which said core member includes a substantially hermetic band surrounding the outer periphery of such member between said beveled brims of the circular ends of the member.

3. A catalytic converter in accordance with claim 1 and in which said core member includes a substantially hermetic band surrounding the outer periphery of such member including said beveled brims of the circular ends of the member.

4. A catalytic converter in accordance with claim 1 and in which said annular space provided between said outer casings and said inner casings and said core member is filled with a high temperature insulation material.

5. A catalytic converter in accordance with claim 2 and in which said annular space provided between said outer casings and said inner casings and said core member is filled with a high temperature insulation material.

6. A catalytic converter in accordance with claim 3 and in which said annular space provided between said outer casings and said inner casings and said core member is filled with a high temperature insulation material.

* * * * *